June 18, 1935.　　　J. M. BOYKOW　　　2,005,530
AUTOMATIC CONTROL DEVICE FOR AIRCRAFT
Filed Oct. 25, 1934
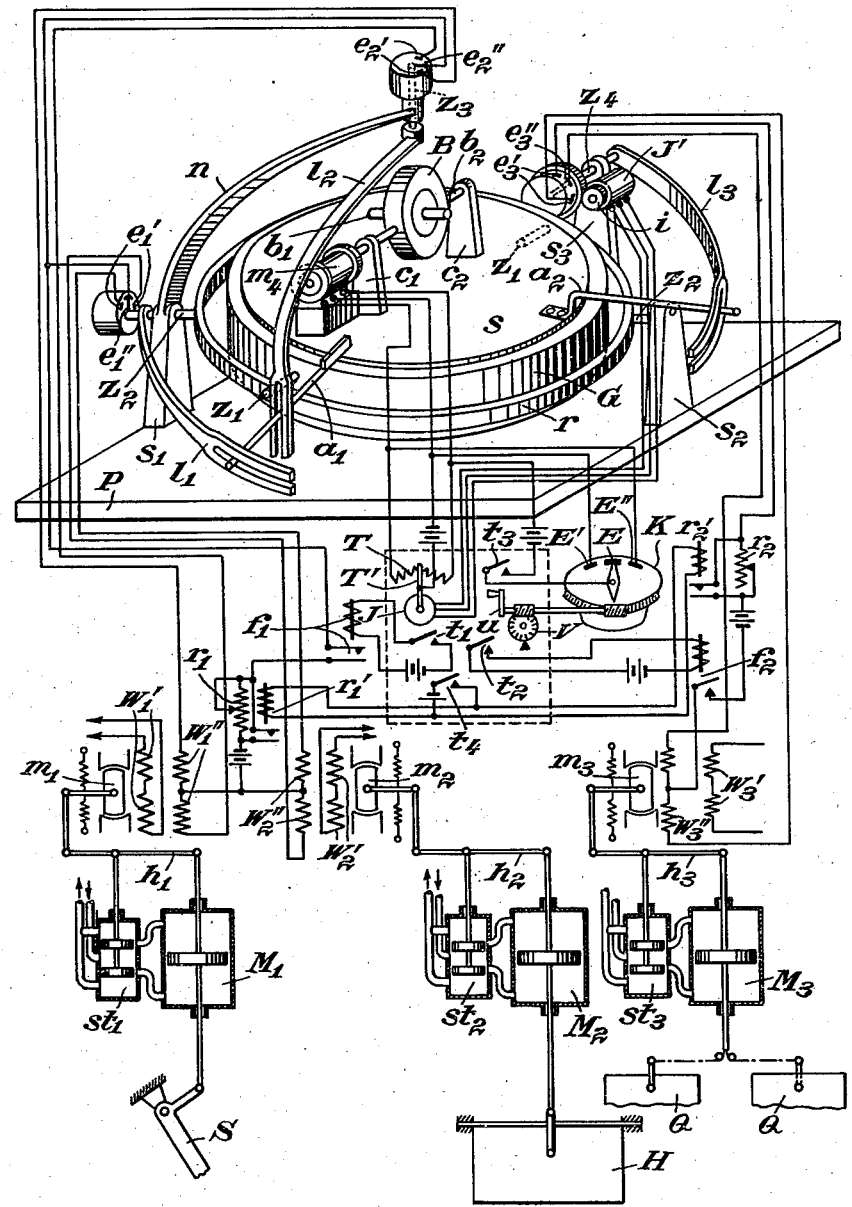
INVENTOR
JOHANN MARIA BOYKOW
By Ftka & Kehlenbeck
ATTORNEYS.

Patented June 18, 1935

2,005,530

UNITED STATES PATENT OFFICE 2,005,530

AUTOMATIC CONTROL DEVICE FOR AIRCRAFT

Johann Maria Boykow, Berlin-Lichterfelde-West, Germany

Application October 25, 1934, Serial No. 749,911
In Germany November 10, 1933

4 Claims. (Cl. 244—29)

This invention relates to automatic control of aircraft by means of servo-motors which adjust the controlling surfaces and which are controlled by navigational instruments, e. g. a compass, an artificial horizon or the like.

A particular object of the invention is the automatic control of aircraft in curved flight. If a curve is to be flown, this can be effected in well known manner by additional regulation of the servomotors, controlled by the navigational instruments, in the sense of the curve to be flown. If only the side rudder will receive such an additional regulation, the aircraft, as is well known, not only takes up an oblique position in the curve but also deviates from its horizontal flying plane in the upward or downward direction such that the curved flight takes place in an oblique plane. The latter is very undesirable and can be avoided merely by an adjustment of the altitude rudder, which is to be effected simultaneously with the adjustment of the side rudder. Therefore, according to this invention the altitude and side control of the aircraft are simultaneously influenced such that a deviation of the aircraft from its horizontal flying plane during the curved flight is avoided or, in other words, that the longitudinal axis of the aircraft turns in a horizontal plane during the curved flight. A further object of this invention is the automatic control of the side and altitude rudder in such a way that a desired helical curve of pre-determinable pitch may also be flown. This control according to this invention may be achieved in each case by a control member which is held by a stabilizer provided in the aircraft, for instance, a gyroscopic pendulum, and is set into the space rotation desired by the pilot, in which case it distributes its movement to regulating members, rotatable about two axes which are perpendicular to one another and which are rigidly guided in the aircraft, for the controlling means provided for the side and altitude control of the aircraft, for instance, servo-motors provided for the adjustment of the side and altitude rudders.

The controlling apparatus consists essentially in a space co-ordinate transformer in which the controlling member which passes through the co-ordinate origin and which is held by the stabilizer is brought into the desired space rotation relatively to the axes forming the craft co-ordinate system, about which the regulating members for the side and altitude controlling arrangements are adjustable. If the space rotation of the controlling member directed through the co-ordinate origin takes place in the horizontal plane maintained by the stabilizer and if the axes about which the regulating members, adjusted by this controlling member, for the side and altitude controlling arrangement are adjustable are so mounted in the aircraft that they lie parallel to the vertical axis or the transverse axis of the aircraft, such a regulation of the altitude and side controlling arrangement takes place that the longitudinal axis of the aircraft exactly follows the space rotation of the controlling member and thus also rotates in a horizontal plane during the curved flight. Now if the controlling member between the two co-ordinate systems is rotated once relatively to the horizontal plane of the stabilizer through a certain angle about an axis transverse to the direction of travel or, what is equivalent to this, if the zero position of the regulating member adjusted thereby about the axis parallel to the transverse axis of the aircraft is rotated through a certain angle in the one or other sense, this has the result that, in contradistinction to the horizontal curved flight, not the longitudinal axis of the aircraft, but another line of the aircraft, inclined with respect to this axis in the section of symmetry of the aircraft by the angle of inclination of the helical flight, remains permanently horizontal during the helical flight.

The controlling member from which the control commences in the curved flight is preferably provided on a horizontal rotating disc held by the stabilizer; its space rotation is preferably effected by a gyroscope mounted on this rotating disc with a horizontal spinning axis and a horizontal precessional axis perpendicular thereto, on which gyroscope there is exerted for this purpose, for instance, by an electrical torque producer coupled with its precessional axis and regulable from the pilot's seat, a torque in either sense and of such intensity that the rotating disc and its controlling member assume the desired angular velocity in the sense of the curve to be flown.

Further details of the invention, particularly also the additional regulation of the transverse controlling arrangement by a further controlling member held by the stabilizer, are fully described in the following with reference to a constructional example diagrammatically illustrated in the drawing.

The upper half of the drawing illustrates, in perspective, the stabilizer with the regulating device, while the altitude, side and transverse controlling arrangements connected to the regulating devices in their simplest construction are to be seen from the lower part of the drawing. Here, the side rudder S and the altitude rudder H, which in reality are arranged one above the other at the tail end of the aircraft, are illustrated side by side. In the bottom right-hand corner are shown the transverse rudders Q usually provided at the ends of the wings of the aircraft. All three rudders are adjusted by a hydraulic rudder motor $M_1$, $M_2$ and $M_3$ respectively, which are connected to the slide valves $st_1$, $st_2$ and $st_3$ respectively. The controlling pistons of these slide valves are adjusted by the differential levers $h_1$, $h_2$ and $h_3$ respectively, in accordance with the difference between the controlling movement transmitted to the left-hand end of these controlling levers and the motor movement transmitted to the right-hand end of these controlling levers. The controlling movement, in this case, is obtained from electric rotary magnets $m_1$, $m_2$ and $m_3$ respectively, the excitation of which is determined by the controlling apparatus illustrated in the upper part of the drawing and also, if desired, by further controlling apparatus independent thereof.

On the armature of each torque producer, to this end, two pairs of oppositely wound exciting coils $w_1'$, $w_1''$, $w_2'$, $w_2''$ and $w_3'$, $w_3''$ respectively are provided. The windings are shown near the rotary magnets for the sake of better illustration. The coils $w_1'$ of the side controlling arrangement are connected, for instance, to an electrolytic compass, while the coils $w_2'$ are controlled in well-known manner by a pendulum which measures the longitudinal inclination of the aircraft, by a relative wind-velocity meter or the like and the coils $w_3'$ by a pendulum measuring the transverse inclination of the aircraft, by a shift velocity meter or the like.

The stabilizer indicating the horizon may have any desired construction. It preferably consists of a gyroscopic pendulum arranged in the casing G. The casing G is universally suspended by means of the inner cardan pivots $z_1$, the ring $r$ and the outer cardan pivots $z_2$, in the supports $s_1$ and $s_2$ arranged, for instance, in the transverse direction of the craft on the platform of the craft or the like. The disc $s$ is mounted so as to be freely rotatable about a vertical axis, on the casing G of the gyroscopic pendulum. Mounted in supports $e_1$ and $e_2$ on this disc is the horizontal precessional axis $b_2$ of a gyroscope B, the spinning axis $b_1$ of which is also horizontal. The position of the precessional axis $b_2$ with respect to the cardan pivots of the gyroscopic pendulum may otherwise be optional. To the precessional axis $b_2$ is coupled the torque producer $m_4$, which is connected to the potentiometer T arranged preferably at the pilot's seat and adapted to be operated by the pilot. This torque producer, again, has two exciting windings which are connected to the two halves of the potentiometer.

According as to whether a left or right-hand curve is to be flown, the pilot adjusts the potentiometer in one or the other direction, whereby the torque producer is energized in one or the other sense and exerts a corresponding precessional torque on the gyroscope B. Consequently, the gyroscope B, while maintaining the horizontal position of its spinning axis $b_1$, rotates the disk $s$ in one or the other sense at the speed adjusted at the potentiometer T. The controlling arms $a_1$ and $a_2$ take part in this space rotation of the disc inside the aircraft. The zero position of the disc $s$ is such that the arm $a_1$ lies in the longitudinal direction and the arm $a_2$ in the transverse direction of the aircraft. The arm $a_1$ engages in the fork slot of two bows $l_1$ and $l_2$, the bow $l_1$ of which is rotatable about the shaft $z_2$ lying in the transverse direction of the craft, the bow $l_2$ being rotatable about a shaft $z_3$ which is parallel to the vertical axis of the aircraft and which is carried, in the constructional example illustrated, by the holder $n$ arranged on support $s_1$. The arm $a_2$, on the contrary, engages in a slotted guide in the bow $l_3$ which is rotatable about a shaft $z_4$ in a bearing bracket $s_3$, which shaft is directed parallel to the longitudinal axis of the aircraft. By each guide lever $l_1$, $l_2$ and $l_3$ there is adjusted a regulating device to which the windings $w_1''$, $w_2''$ or $w_3''$ of the rotary magnets $m_1$, $m_2$ and $m_3$ respectively, operating the side, altitude and transverse controlling arrangement, are connected.

The regulating devices in the constructional example each consist of an electrolytic casing fixed to the bearing brackets $s_1$, $s_3$ and the holder $n$ respectively and having two counter-electrodes $e_1'$, $e_2'$ and $e_3'$ respectively, between which the main electrodes $e_1''$, $e_2''$ and $e_3''$ respectively adjusted by the bows $l_1$, $l_2$ and $l_3$ respectively are adapted to move. On adjustment of the bows $l_1$, $l_2$ and $l_3$ by the lever arms $a_1$ and $a_2$, therefore, the windings $w_1''$, $w_2''$ and $w_3''$ receive an excitation proportional to the angle of adjustment of these bows.

In the case of a straight flight, the altitude transverse and side controlling arrangements may be disconnected from the described control apparatus by means of the switches $t_1$ and $t_2$ arranged at the pilot's seat, which operate interrupting relays $f_1$ and $f_2$ in the circuit of the exciting winding $w_1''$, $w_2''$ and $w_3''$ respectively. In this case, the rotary magnets $m_1$, $m_2$ and $m_3$ are merely controlled by the above-mentioned measuring apparatus (not shown), to which the windings $w_1'$, $w_2'$ and $w_3'$ are connected. The control in the case of straight flight, however, may be effected alone or, in addition, also by the controlling arms $a_1$ and $a_2$ of the gyroscopic pendulum. However, it is then necessary that the arm $a_1$ should remain adjusted in the direction of the desired course. This can be effected, for instance, by supervising the position of the rotary disc $s$ by means of a compass K, which is designed in the constructional example as an electrolytic compass, the casing of which is adjusted to the desired course direction, according to the scale $v$, by the handle $u$ arranged at the pilot's seat. If the aircraft then deviates from the desired course owing to a wrongly adjusted direction of the controlling arm $a_1$, the magnet system of the compass K deflects with the main electrode E in relation to the counter-electrodes E' and E'' in the one or the other direction, whereby the torque producer $m_4$ is energized in such a sense that the gyroscope B brings the disc $s$ with the connecting arm $a_1$ again into the desired course direction.

During the curved flight, the transverse controlling arrangement may be disconnected from the controlling apparatus by means of the switch $t_2$ and the interrupting relay $f_2$ connected thereto. In the same way, the circuit of the electrolytic compass K can be broken by means of the switch $t_3$, so that the compass is disconnected from the torque producer $m_4$. If the pilot then sets the disc $s$ into the desired space rotation by adjusting the potentiometer T, the controlling arm $a_1$ so adjusts the regulating arrangements, connected to the bows $l_1$ and $l_2$, for the rotary magnets $m_1$ and $m_2$, that an adjustment of the rudders S and H takes place such that the aircraft follows the space rotation of the controlling arm $a_1$ with its longitudinal axis, and therefore the longitudinal axis rotates in a horizontal plane.

However, it is not absolutely necessary that the compass K should be disconnected during the curved flight. If the controlling influence of the compass is only small in comparison with the controlling influence proceeding from the voltage divider T, the compass may remain permanently connected to the torque producer $m_4$. The control is then such that the aircraft, as long as the potentiometer T is adjusted in one or the other sense, flies one or more loops and subsequently adjusts itself again to the course adjusted at the casing of the compass K.

Finally, the voltage divider at the pilot's seat may also be entirely dispensed with, inasmuch as a curve (of course, only a very slight curve) can also be flown by the pilot continuously slowly rotating the casing of the compass K, which results in a corresponding continuous excitation of the torque producer $m_4$ and thus in a rotation of the disc $s$.

If the transverse controlling arrangement is not disconnected during the curved flight from the horizon, it can be seen that the aircraft is also kept horizontal in the curve. The controlling arm $a_2$ then initiates such an adjustment of the transverse rudders Q that the transverse axis of the aircraft remains equally directed. This may be of importance in the case where the territory flown over in curved loops is to be observed or photographed from the aircraft. The observation telescope, camera or the like may then be fixed to the aircraft; a universal suspension or special stabilization for these apparatus is therefore unnecessary in this case.

The case will now be described in which not a horizontal curve (in a horizontal plane) but a helical curve is to be flown. This could be effected in principle by upwardly or downwardly rotating the control arm $a_1$ about the transverse axis of the horizon, out of the plane of this horizon and through a certain angle corresponding to the desired pitch of the helical flight. The arm $a_1$, to this end, would have to be capable of rotating on the disc $s$ in the vertical direction; if the controlling operations which are then initiated are successively considered, then by the adjustment of the controlling arm $a_1$ in the vertical plane, in the first instance, only the bow $l_1$ is simultaneously rotated. Therefore, the main electrode $e_1''$ is rotated relatively to the counter-electrodes $e_1'$ until by corresponding adjustment of the altitude rudder H, the longitudinal axis of the aircraft is rotated parallel to the controlling arm $a_1$ and thus the regulating arrangement $e_1'$, $e_1''$, and thereby also the rudders H, return to their zero position. The inclination of the aircraft corresponding to the inclination of the arm $a_1$ is maintained in the succeeding period. It can be seen that if the arm $a_1$ is now set in rotation owing to adjustment of the potentiometer, the aircraft simultaneously rises or falls and rotates, that is, flies a helical curve. In this case, that straight line of the aircraft which is directed parallel to the arm $a_1$ and through the centre of gravity of the aircraft remains horizontal. Therefore, in helical flight, this imaginary straight line and not the longitudinal axis of the aircraft rotates in its horizontal plane.

In practice the said adjustment of the arm $a_1$ cannot be effected at the gyroscopic pendulum, since thereby the horizon would be set into vibration. However, it amounts to the same if the arm $a_1$ is left in the horizontal plane and instead of this, the casing of the electrolytic system is rotated once with the counter-electrodes $e_1'$ through the desired angle of inclination of the helical flight. This can be effected without difficulty at the bearing bracket $s_1$ by the electrolytic casing being rotatable thereon. The adjustment could also be effected from the pilot's seat by means of an electric remote transmitting system. As can be seen without difficulty, an adjustment of the altitude control will then also have to take place for such a length of time and in such a manner that the electrolytic systems returns to the zero position and the aircraft is thus inclined about its transverse axis by the desired angle.

Both in horizontal and in helical flight, the aircraft may also be given a constant oblique position about its longitudinal axis by a corresponding rotation of the electrolytic system operated by the transverse controlling bow $l_3$. Such a constant oblique position of the aircraft in the curve may also be very desirable again on the adjustment of optical or photographic apparatus and also when throwing off loads, for instance, mail bags. The aircraft can also be kept completely horizontal, as in the previously mentioned case, only in weak curves; in sharper curves, a horizontally-positioned aircraft would slip too much in a lateral direction owing to the great centrifugal force. This can only be prevented by a corresponding oblique disposition of the aircraft.

In order to avoid any lateral slipping of the aircraft in the curve, as is well-known, its transverse axis must be inclined by that angle by which the direction of the total acceleration resulting from the earth acceleration and the centrifugal acceleration deviates from the vertical direction. According to a further feature of the invention, the oblique position of the aircraft about its longitudinal axis may also be automatically regulated in accordance with that degree of curvature of the curve, which is to be adjusted at the pilot's seat.

The speed of rotation of the disc $s$ which determines the speed of rotation of the aircraft, that is, the curvature of the curve, is dependent upon that intensity of the energization of the torque producer $m_4$ which is adjusted at the potentiometer T. If, therefore, a transmitter J, of, for instance, motor-like construction, is connected to the axis of the switch arm T' of the voltage divider, and then by means of the receiver J' connected thereto and arranged on the bearing bracket $s_3$, the casing of the electrolytic system on the axis of the transverse controlling bow $l_3$ is adjusted through a pinion $i$; the counter-electrodes $e_3'$ of this electrolytic system are additionally rotated at the time through an angle corresponding to the deflection of the current-tapping bow T'. This means that quite a definite transverse inclination of the aircraft (about its longitudinal axis) corresponds to each speed of rotation of the aircraft which is adjusted at the potentiometer T. In practice, the pilot will be enabled to adjust, for instance, three different curve intensities at the potentiometer T.

To each of these curve intensities there will then belong quite a definite transverse inclination of the aircraft, which is then chosen in such a manner that the aircraft cannot slip laterally in the curve.

The entire controlling installation hitherto described, in order to be able to swing the aircraft easily into the curve-position, will have to work very elastically, that is, the influencing of the rotary magnets $m_1$—$m_3$ by the electrolytic system will usually have to be comparatively small. The intensity of the influencing is variable in each case by a regulating resistance $r_1$ or $r_2$ inserted in the circuit of the rotary magnets $m_1$ and $m_2$ or $m_3$. If, however, it is a question of maintaining a curve-position already occupied by the aircraft, for instance, for the purpose of observing the territory flown over or the load dropping, the regulating resistances $r_1$ and $r_2$ are short-circuited by relays $r_1'$, and $r_2'$, which are connected to a switch $t_4$ provided at the pilot's seat. The adjusted torque of the rotary magnet $m_1$ to $m_3$ is then considerably greater. The smallest deviations of the aircraft from the position adjusted at the horizon then immediately result in a considerable effect on the rudder placing devices, so that the aircraft quite rigidly maintains its position.

Finally it should also be mentioned that for maintaining the horizontal position of the axis of rotation $b_1$ of the gyroscope B, correcting devices well-known per se must also be provided. Without these, the gyroscope B would already leave the illustrated position in the course of time, owing to the frictional influences in the bearings of its precessional axis.

If there is mounted on the casing G a torque producer which acts on the shaft of the disc $s$ and controls this torque producer by means of a contact mechanism, the contact arm of which is mounted on the precessional axis $b_2$ of the gyroscope and moves between two counter-contacts provided on the disc $s$, it can be seen that on each deviation of the axis of rotation $b_1$ of the gyroscope out of the illustrated horizontal position, there is exerted on the rotary disc and thus on the gyroscope a correcting torque which again brings the gyroscope into its correct position.

I claim:

1. In an automatic control device of aircraft the combination with a vertical rudder and means for turning said vertical rudder, of an altitude rudder and further means for turning said altitude rudder, of a stabilizer universally mounted within the aircraft, of a controlling member mounted on said stabilizer, of means for rotating said member in a plane stabilized by said stabilizer and of two regulating devices for said means for turning the vertical and the altitude rudder, said regulating devices being operatively connected to said controlling member.

2. In an automatic control device of aircraft the combination with a vertical rudder and means for turning said vertical rudder, of an altitude rudder and further means for turning said altitude rudder, of a stabilizer universally mounted within the aircraft, of a controlling member mounted on said stabilizer, of means for rotating said member in a horizontal plane stabilized by said stabilizer and of two regulating devices for said means for turning the vertical and the altitude rudder, said regulating devices being operatively connected to said controlling member.

3. In an automatic control device of aircraft the combination with a vertical rudder and means for turning said vertical rudder, of an altitude rudder and further means for turning said altitude rudder, of a stabilizer universally mounted within the aircraft, of a controlling member mounted on said stabilizer, of means for rotating said member in a plane stabilized by said stabilizer, of means for adjusting said controlling member relatively to the horizon of the stabilizer in a vertical plane and of two regulating devices for said means for turning the vertical and the altitude rudder, said regulating devices being operatively connected to said controlling member.

4. In an automatic control device of aircraft the combination with a vertical rudder and means for turning said vertical rudder, of an altitude rudder and further means for turning said altitude rudder, of a stabilizer universally mounted within the aircraft, of a controlling member mounted on said stabilizer, of means for rotating said member in a plane stabilized by said stabilizer, and of two regulating devices for said means for turning the vertical and the altitude rudder, said regulating devices being operatively connected to said controlling member and adjustable about axes parallel to the vertical and transverse axes of the aircraft.

JOHANN MARIA BOYKOW.